US009963599B2

(12) United States Patent
Woolf et al.

(10) Patent No.: US 9,963,599 B2
(45) Date of Patent: May 8, 2018

(54) MATERIAL COMPOSITIONS FOR LIGHTNING STRIKE PROTECTION

(71) Applicant: General Atomics, San Diego, CA (US)

(72) Inventors: Lawrence Woolf, San Diego, CA (US); Karen Spinar, San Diego, CA (US); Thomas McGovern, San Diego, CA (US)

(73) Assignee: General Atomics, San Diego, CA (US)

( * ) Notice: Subject to any disclaimer, the term of this patent is extended or adjusted under 35 U.S.C. 154(b) by 75 days.

(21) Appl. No.: 14/720,707

(22) Filed: May 22, 2015

(65) Prior Publication Data

US 2016/0340518 A1 Nov. 24, 2016

(51) Int. Cl.
C09D 5/24 (2006.01)
C09C 1/00 (2006.01)
C09C 1/62 (2006.01)
C09C 1/64 (2006.01)

(52) U.S. Cl.
CPC ............... *C09D 5/24* (2013.01); *C08K 3/013* (2018.01); *C09C 1/627* (2013.01); *C09C 1/64* (2013.01); *C01P 2004/54* (2013.01); *C01P 2004/61* (2013.01); *C01P 2006/40* (2013.01); *C09C 1/0015* (2013.01); *C09C 2200/1054* (2013.01);
(Continued)

(58) Field of Classification Search
CPC .................................. C09D 5/24; C08K 3/00
USPC ........................................................ 252/500
See application file for complete search history.

(56) References Cited

U.S. PATENT DOCUMENTS

| 4,479,163 A | 10/1984 | Bannink, Jr. et al. |
| 4,502,092 A | 2/1985 | Bannink, Jr. et al. |
| 4,542,056 A | 9/1985 | Anglin et al. |

(Continued)

FOREIGN PATENT DOCUMENTS

| EP | 0 629 549 A2 | 12/1994 |
| EP | 2 440 622 A1 | 4/2012 |

(Continued)

OTHER PUBLICATIONS

Fisher, F., et al., "Lightning Protection of Aircraft", Lightning Technologies Inc., Pittsfield, MA, Second Edition, pp. 185-187 & 190-195, 2004.

(Continued)

*Primary Examiner* — Harold Pyon
*Assistant Examiner* — Danny N Kang
(74) *Attorney, Agent, or Firm* — Perkins Coie LLP

(57) ABSTRACT

Methods, systems, and devices are disclosed for implementing lightning strike protective compositions. In one aspect, a composition for providing protection against electrical discharges (e.g., including lightning strikes) for composite structures includes a binder material capable of dispersing material structures therein and attaching to a surface of a substrate, and a plurality of pigment structures dispersed in the binder material. The pigment structures include a central layer including an electrically conducting material, and outer layers formed on the central layer, in which the outer layers include an optical absorber material or a dielectric material. The composition, when attached to the substrate, is capable of providing electrically conductive paths to transfer electrical current from a multi kiloamp electrical discharge within the composition.

51 Claims, 5 Drawing Sheets

(52) U.S. Cl.
CPC .. *C09C 2200/301* (2013.01); *C09C 2200/302* (2013.01); *C09C 2200/303* (2013.01)

(56) References Cited

U.S. PATENT DOCUMENTS

| | | | |
|---|---|---|---|
| 4,599,255 | A | 7/1986 | Anglin et al. |
| 5,225,265 | A | 7/1993 | Prandy et al. |
| 6,150,022 | A * | 11/2000 | Coulter ................ C09C 1/0015 106/499 |
| 6,235,105 | B1 | 5/2001 | Hubbard et al. |
| 6,686,042 | B1 * | 2/2004 | LeGallee .................. B32B 7/02 106/404 |
| 8,932,724 | B2 | 1/2015 | Woolf |
| 2006/0023327 | A1 | 2/2006 | Coombs et al. |
| 2011/0014356 | A1 * | 1/2011 | Fornes .................... C09D 5/24 427/58 |
| 2011/0299167 | A1 | 12/2011 | Woolf |
| 2012/0219420 | A1 | 8/2012 | Lewke |
| 2013/0101833 | A1 | 4/2013 | Sang et al. |

FOREIGN PATENT DOCUMENTS

| | | |
|---|---|---|
| WO | 1984/001487 A1 | 4/1984 |
| WO | 2010/144762 A1 | 12/2010 |

OTHER PUBLICATIONS

Gardiner, G., "Lightning strike protection for composite structures," High-Performance Composites, pp. 44-50, Jul. 2006.

* cited by examiner

Damage through a panel covered by conventional aerospace paint

Front        Back

First ply damage of a panel covered by flake-based paint of disclosed technology     No damage Front        Back

MATERIAL COMPOSITIONS FOR LIGHTNING STRIKE PROTECTION

TECHNICAL FIELD

This patent document relates to electrically conductive material coatings, pigments, and compositions and fabrication processes of such coatings, pigments, and compositions for lightning strike protection (LSP).

BACKGROUND

Aircraft, large commercial jets, and wind turbines are vulnerable to lightning strikes. For example, aircraft are typically struck once or twice a year by lightning during flight. Unlike some older aircraft designs using all metal materials, some newer aircraft designs use conventionally painted composite materials that do not readily conduct away the extreme electrical currents (e.g., up to 200 kA) generated by lightning strikes. Some composite materials used in aircraft are not electrically conductive (e.g., fiberglass) or are substantially less electrically conductive (e.g., carbon fiber composites (CFC) or graphite fiber composites) than metallic materials. Thus, when struck by lightning, these composite materials may provide insufficient or no electrical conduction paths, and the electrical current from the lightning strike causes dangerous and costly damage to the composite materials. For example, lightning strikes can vaporize and burn through materials proximate the strike area, causing "direct effect" damage (e.g., vaporized metal control cables, vaporized resin in the composite with burn through of the laminate) or "indirect effect" damage (e.g., electromagnetic effects that damage aircraft electronic systems).

SUMMARY

Disclosed are electrically conductive compositions that provide protection against extreme electrical discharges like lightning strikes. In some implementations, multi-layered flake based pigment compositions and coatings are disclosed to withstand lightning strikes.

In one aspect, a composition for providing lightning strike protection for a composite structure includes a multilayer coated film including an electrically conductive material formed as a top layer on the composite structure. Implementations of the composition can include one or more of the following features. For example, in some implementations, the composition is capable of protecting the composite structure from the lightning strike electrical discharges such that there is minimal damage or damage insufficient to cause failure throughout the thickness of the composite structure. Also, for example, in some implementations, the multilayer coated film can further include an outer layer formed on the electrically conducting material, in which the outer layer includes a dielectric material or an optical absorber material in at least some of the visible light spectrum, also referred to as a visual light absorber material. Also, for example, in some implementations, the multilayer coated film can further include a second outer layer formed on the outer layer, in which the second outer layer includes a visual light absorber material or a dielectric material. Also, for example, in some implementations, the multilayer coated film can further include a third outer layer formed on the second outer layer, in which the third outer layer includes a visual light absorber material or a dielectric material.

In one aspect, a composition for providing protection against electrical discharges includes a binder material capable of dispersing material structures therein and attaching to a surface of a substrate; and a plurality of pigment structures dispersed in the binder material, in which the pigment structures include a central layer including an electrically conducting material, and an outer layer formed on opposing surfaces of the central layer, where the outer layer includes a dielectric material or an optical absorber material (e.g., a visual light absorber material) including a semiconductor or a thin metal layer. The composition, when attached to the substrate, is capable of providing electrically conductive paths to transfer electrical current from a multi kiloamp electrical discharge within the composition, e.g., laterally within the composition.

In one aspect, a composition for providing lightning strike protection for a composite structure includes a binder material capable of dispersing material structures therein and attaching to a surface of the composite structure; and a plurality of pigment structures dispersed in the binder material, in which the pigment structures include a layer of an electrically conducting material, in which the pigment structures include an aspect ratio of length to thickness being at least 3:1. The composition, when attached to the composite structure, is capable of providing electrically conductive paths to lightning strike electrical discharges within the composition, e.g., laterally within the composition. For example, in some implementations, the composition is capable of protecting the composite structure from the lightning strike electrical discharges such that there is no damage or insubstantial damage to cause failure throughout the thickness of the composite structure. Also, for example, the pigment structures of the composition are structured to have an aspect ratio of length to thickness being at least 5:1.

The subject matter described in this patent document can be implemented in specific ways that provide one or more of the following features. For example, the disclosed flake pigments based paint compositions provide protection for the composite materials against environmental degradation, e.g., particularly a combination of UV radiation and moisture ingress, in addition to providing lightning strike protection for the composite structures (such as carbon fiber composite materials) to which the composition is applied. Exemplary paint compositions of the present technology can include flake pigments containing electrically conductive layers that can have a wide range of colors, as needed for aircraft, and are environmentally and mechanically robust due to the hard layers that can surround the electrically conductive layers and due to the properties of the binder system in which the flake pigments are contained. For example, colored paints of the present technology can be produced without the addition of undesired relatively dense and heavy and electrically insulating standard pigment colorants, which are generally metal oxides. In some implementations, the flake based pigments contain metal layers such as the desired low density high electrical conductivity aluminum material that are electrically isolated from the carbon or graphite fiber composites to which the composition is applied, in which the electrical isolation is due to semiconducting/absorber or dielectric layers that surround the top and bottom surface of the aluminum layer as well as the binder material, thereby minimizing galvanic corrosion associated with aluminum in the presence of graphite fiber composites. Notably, for example, the disclosed flake pigments based paint compositions exhibit greater lightning strike protection than conventional non-metallic pigment based paints and paints loaded with metallic particles, due to the overlapping nature of flake based electrically conducting materials. Also, for example, the flake pigment based paints of the disclosed technology are much lighter than conventional solutions for lightning strike protection that use relatively heavy metal foils and screens that are incorporated into the composite structure. Furthermore, the lightning strike paint of this disclosed technology can allow for much easier repairs to structures to which it is applied when lightning strike damage occurs, e.g., as compared to existing composite structures that incorporate metal screens and foils that are integral to such composite structures. Further, these multilayer coatings on suitable plastic substrates such as Tedlar®, can be used as the top layer in composite structure to provide lightning strike protection and color.

DETAILED DESCRIPTION

Lightning strike protection (LSP) of aircraft that use composite materials or structures can be technically challenging or difficult because the composite structure or material may not be sufficiently electrically conductive and can be much less electrically conductive than standard metallic aircraft. Lightning strikes can damage composite aircraft, resulting in significant damage or causing them to crash. Therefore, composite structures require lightning strike protection. For example, dielectric properties of the resin of the composite structures and paint on the surface can cause the lightning to penetrate into the composite panel, disbonding the layers and pyrolyzing the resin. LSP can enable the current to travel and spread out across the LSP part as well as the carbon or graphite fiber composite, dissipating electrical energy without causing significant structural damage. When exposed to lightning, most composites tend to show signs of damage even when lightning protection has been applied. The amount of damage that the aircraft can sustain needs to be determined for each aircraft design.

For example, lightning will be attracted to differing locations for various aircraft configurations. Therefore, to protect any aircraft from lightning strikes, each aircraft design is typically evaluated individually. For example, an aircraft design can be divided into zones designating where the typical location of lightning attraction occurs. These different zones are exposed to different lightning environments (e.g., current components), and lightning protection in these zones needs to be evaluated accordingly. For example, typically the nose and tail/wing tips of the aircraft receive the most severe current components, and in these locations lightning protection may be different than in other zones such as the fuselage and wing bodies.

Figure 1:
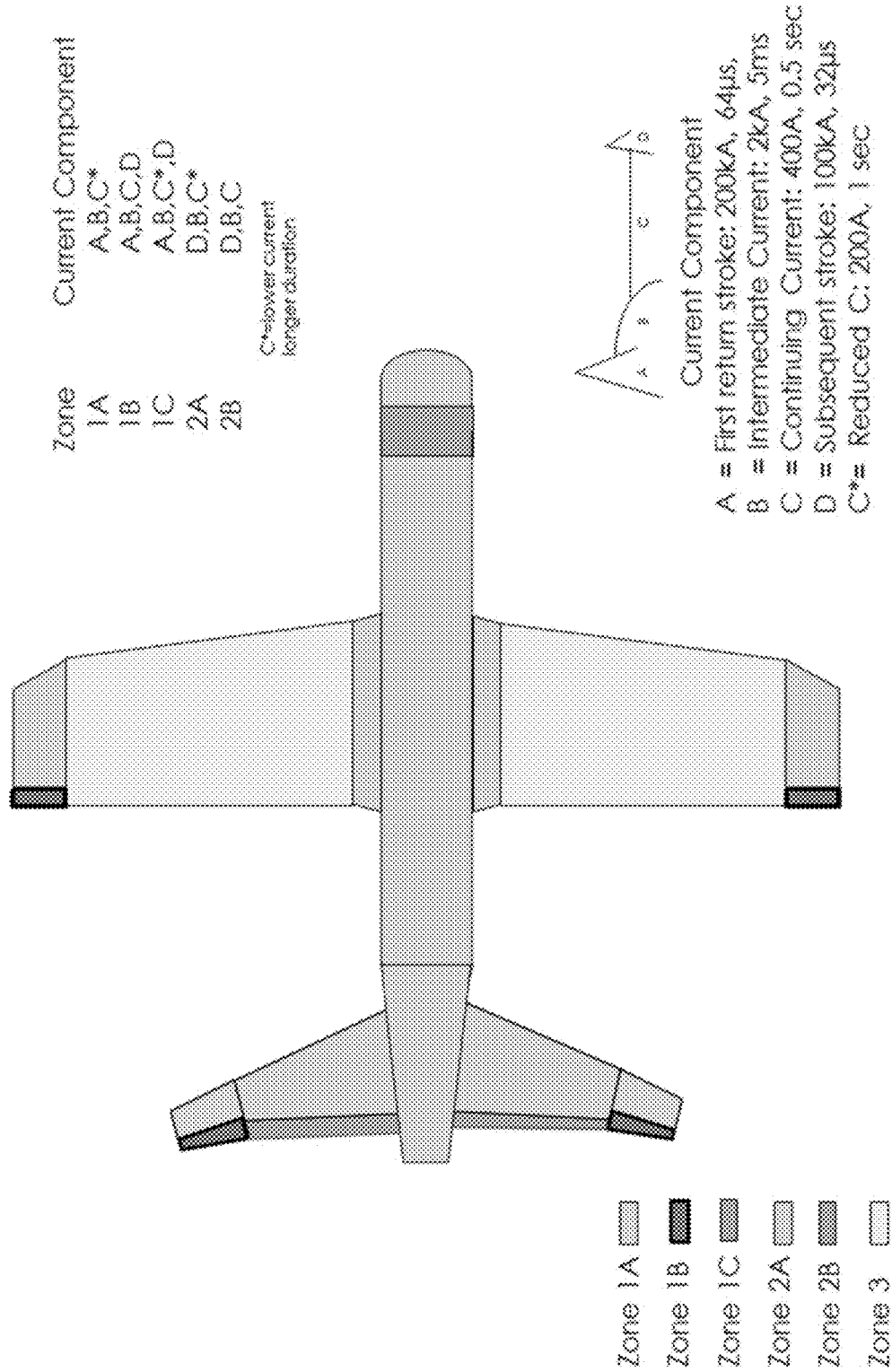
FIG. 1 shows a diagram of typical aircraft zone locations that differ in lightning strike effects.

FIG. 1 shows a diagram of typical aircraft zone locations that differ in lightning strike effects. The different zones of the aircraft are shown in FIG. 1, and for each zone, there is a standard lightning strike test that involves a succession of current components as shown. Zone 1 including Zones 1A, 1B, and 1C constitutes the most severe lightning strike conditions, Zone 2 including Zones 2A and 2B is less severe than Zone 1, and Zone 3 involves current transport but not direct lightning strike.

There are five current components making up the lightning strike test environment for each zone, as shown in FIG. 1. Current component A represents the electrical current component of a first return stroke, e.g., which is the most intense (e.g., 200 kA) and occurs quickly (e.g., 64 µs). Current component B represents the electrical current component of an intermediate current, e.g., which includes a lower current amplitude (e.g., 2 kA) and occurs over a longer time (e.g., 5 ms). Current component C represents the electrical current component of a continuing current, e.g., which includes relatively much lower current (e.g., 400 A) and occurs relatively very slowly (e.g., 0.5 sec). Current component C* represents the electrical current component of a reduced continuing current, e.g., in which the intensity is lower than category C (e.g., 200 A) but the duration is longer than category C (e.g., 1 s). Current component D represents the electrical current component of a subsequent stroke, e.g., which as compared to a category A current component is half of the current (e.g., 100 kA) and half of the duration rate (e.g., 32 µs).

Some conventional approaches to lightning strike protection have included incorporating a metallic mesh in the composite structure and then electrically tying all of these pieces together throughout the aircraft so there is a continuous metallic pathway. Other approaches have included using conventional paints that contain electrically conductive pigment particles, but these may be the least desirable methods of LSP because of voltage buildup problems and also because such conductive paints tend to erode away when exposed to intense rain or hail. In general, such conventional approaches are complex or ineffective, and can add significantly to the financial cost and weight of the composite aircraft.

Direct lightning strike protection for the external surface of composite structures has been typically provided by metal and metallized products, e.g., such as metal screens and expanded metal foils that are placed at or near the surface of the composite, often laid up as the first (top/outer) ply of the composite structure. For example, aluminum is often a preferred metal because of its low density and high electrical conductivity, but it is not often used due to galvanic corrosion that occurs when it is in contact with carbon fiber. Copper, although more dense than aluminum, is the most often used metal since there are no galvanic corrosion issues for copper when it is in contact with carbon fiber.

Therefore, it would be preferred if lightning strike protection could be provided using aluminum as the conductive metal but without galvanic corrosion issues. It would also be preferred if lightning strike protection could be provided using materials that are significantly lighter than metal screens and foils to save weight on aircraft that use light weight composite materials.

Carbon fiber composite structures must be painted to protect the carbon fiber composite from degradation due to moisture. It is critical that the paint thickness for standard non-electrically conductive paints be minimized because if the paint is too thick, then the lightning does not readily conduct through the paint to the copper mesh that is often used for lightning strike protection. Other electrically insulating materials that are on the surface of the composite structure, such as primer or surface smoothing materials, e.g., such as Bondo®, are also detrimental to lightning strike protection, and their thicknesses must also be minimized for improved lightning strike protection.

Some conventional approaches have used metal loaded paints for lightning strike protection. These often contain copper or aluminum or nickel particles that are loaded into a binder to form a paint. To create colors different from those created by the copper or aluminum or nickel particles requires the addition of electrically insulating colorant particles, e.g., such as various metal oxides. The protection has been found to be marginal due to the random contact that the electrically conductive metal particles make with each other and due to the insulating nature of paint binders and the colorant particles. Conductive paints have an advantage in that they can be applied to existing surfaces including complex shapes. Notably, a disadvantage of conductive paints as a lightning strike protection material is that paints can often erode away when exposed to intense rain or hail.

For example, as stated in "Lightning Protection of Aircraft", a book by Fisher, Plumer, and Perala (2004), when using metal paints, "protection is marginal, however, because the metal particles make only random contact with each other, which gives the coating a much lower conductivity than an equivalent film of pure metal." And "no practical thickness of metal loaded paint is sufficient to conduct a full lightning current." Therefore it would be expected that a paint containing metal pigment would not provide lightning strike protection for composite structures for the most severe standard lighting tests, such as the Zone 1 or Zone 2 tests.

It would therefore be of great benefit if electrically conductive paints could be made that could provide lightning strike protection for composite structures and materials by passing Zone 1 or Zone 2 tests. It would also be of benefit if electrically conductive paints could be made that that contained light weight metals, e.g., such as aluminum or copper or comparable lightweight metal alloys, to minimize weight. It would be a further advantage if these paints could be colored without the addition of non-conductive colorant particles. It would be a further advantage if the aluminum were protected from direct contact with carbon or graphite fibers so that galvanic corrosion issues did not occur when used with carbon or graphite fiber composites. It would be a further advantage if the electrical conductance of the paint could be enhanced by using flake shaped pigments that would enhance the electrical conductance of the paint via large area overlap or near overlap of the large area surfaces of the flakes. It would be further advantage if the flake-shaped pigments could be colored to match the colors required for various aerospace applications. Moreover, it would be of great advantage if the paint included a paint binder and pigments that were environmentally and mechanically stable and would not erode away when exposed to intense hail or rain. Finally, it would be a significant advantage if the use of electrically conductive paints could be made that reduce or eliminate the need for heavy and costly metal screens and metal foils that are often used for lightning strike protection.

Disclosed are electrically conductive pigment and coating compositions for use in paints and surfacing films for providing lightning strike protection. In some implementations, the disclosed compositions include multi-layered flake based pigments and coatings that possess enhanced electrical conductivity (e.g., as compared to conventional paints and other types of metal particle based paints), which can be applied to surfaces of existing composite materials and structures to protect against extreme electrical discharges like lightning strikes. For example, some exemplary paints of the disclosed technology provide such enhanced electrical conductivity without the use of embedded metal mesh screens or foils. The coatings of the present technology may be incorporated into composite structures (e.g., prepregs, tapes, and fabrics), for example, by co-curing, as an outermost surface layer. In some implementations, these coatings are configured as pigments that are incorporated into paints that are applied to the outer surface of composite structures.

In this patent document, when referring to composite structures, carbon and graphite are used interchangeably, as most composite structures include either graphite or carbon fibers, in which the graphite structure is a crystalline form of the carbon structure, and the element carbon is the primary constituent of both carbon and graphite fibers. Composite structures can also include quartz or glass fibers within a resin matrix. These more electrically insulating composite structures are typically used in radomes. These radomes will preferably use electrically conductive lightning strike paint that contain no or minimal metal layers, but instead use electrically conductive semiconductor layers such as silicon.

The present technology described herein disclose multi-layered flake based pigment and coating compositions, and techniques to fabricate and implement such compositions, for providing significant immunity against damage from extreme electrical discharges such as lightning strikes. In some implementations, the disclosed compositions provide such protections without using embedded metal mesh structures. In other implementations, embedded metal structures could be used in conjunction with the exemplary paint compositions described herein. For example, when the paint composition is used in conjunction with embedded metal structures, the amount of lightning strike damage would be even less than if the embedded metal structures were used alone. For composite aircraft that are very light and use a small number of plys, for example, such as in the wings, minimizing damage to none or very few plys can be very important for maintaining air worthiness, since there may only be 2-3 plys in the entire composite wing structure.

In some aspects, the material pigment and coating compositions can be configured as paints that include multi-layered flake-shaped pigment with electrically conductive constituents that can provide lightning strike protection over substantial or all parts of a body to which the paint is applied, e.g., including composite aircrafts. These electrically conductive constituents can include semiconductor materials such as silicon and metal materials such as aluminum. For example, the exemplary lightning strike protection paint can be configured to have a thickness in a range of 1-3 mils (0.001-0.003 inches). In some examples, the exemplary flake-shaped pigments in the paint can be configured to have thicknesses of about 0.2-2 microns, in which typical flake lateral dimensions can be 5-60 microns, e.g., preferably 20-40 microns, and typical pigment volume concentrations (PVC) can be 10-30%, preferably 15-22%. In some implementations, for example, colored flakes can be obtained by using thin film interference or selective absorption by using layers that absorb light in the visible (400-700 nm) wavelength spectrum such as silicon or thin metal layers such as chromium or titanium. Using these materials, the color can be matched to conventional aircraft paint colors without the use of non-electrically conductive and standard colored pigment particles. The color matching can be done by making a number of different colors and then mixing them to obtain the final desired color.

In some embodiments, a composition for LSP can be structured to include a flake shaped pigment structure (having a high aspect ratio) in a binder material (e.g., such as paint, including an acrylic based paint binder system). For example, a binder is a material or substance that holds or draws other materials together to form a cohesive whole. The binder material can be used to mix with pigment in order to hold the pigment particles together in the formation of paint. In its simplest embodiment, for example, the flake shaped pigment structure may consist of only an electrically conductive layer. In some embodiments, for example, the pigment structures can include a central layer including an electrically conductive material, and an outer absorber layer including a semiconductor material and/or a dielectric material on each of the top and bottom surfaces of the central layer. The composition, when attached to the substrate, is capable of providing electrically conductive paths to transfer electrical current from a multi-kiloamp electrical discharge, such as a lightning strike, within the composition and/or to the graphite composite structure, while preventing the electrical discharge from significantly affecting (e.g., damaging) the underlying composite substrate. For example, the composition provides the electrically conductive paths that can transfer the electrical current laterally within the composition, or through the composition to the underlying composite structure, which can include transfer laterally as well as through the composite structure. For example, a successful lightning strike protection material would prevent a hole from forming throughout the composite structure from a lightning strike. For an unsuccessful lightning strike material, a hole would form or an excessive number of plys of the composite structure would be damaged.

Figure 2:
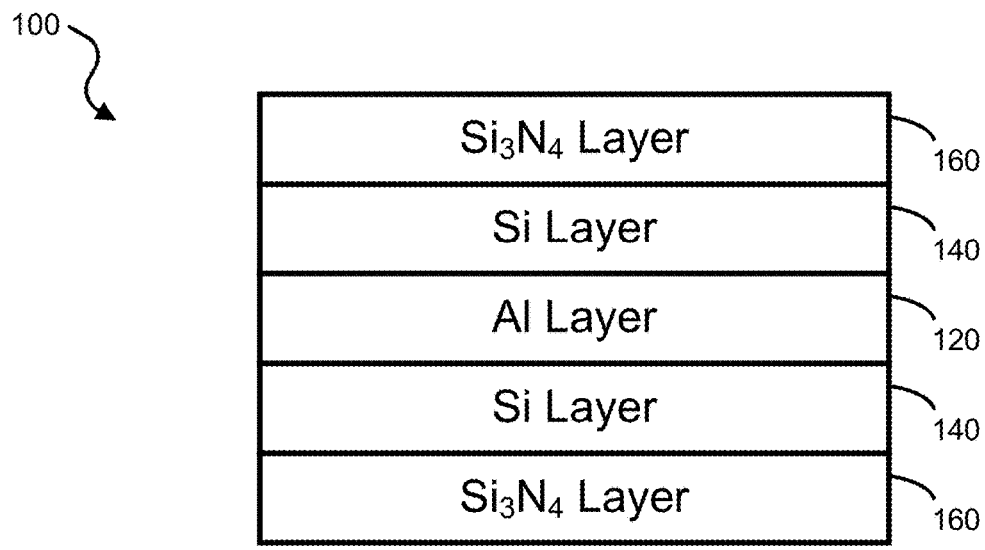
FIGS. 2-5 show block diagrams of exemplary flake pigment compositions of the disclosed technology for desired colored configurations.

FIG. 2 shows a block diagram of an exemplary layered structure of a flake shaped pigment 100 structured to have a desired color configuration. The pigment 100 includes one or more electrically conducting material layer 120, e.g., such as a metal material, preferably including aluminum (Al). In some implementations, an exemplary Al layer 120 can be configured to have a thickness in the range of about 50 nm to about 5000 nm, and in some embodiments, in a range of 100-250 nm. The flake shaped pigment 100 includes one or more of outer protective layers 140 and/or 160 of non-metallic materials. In some implementations, a first outer layer 140 can include an optical absorber material, e.g., such as a semiconductor material, e.g., including silicon, or a thin metal such as chromium or titanium (e.g., having a thickness of 1-20 nm), as an interior outer layer formed on both sides of the electrically conducting material layer 120. A second outer layer 160, which may be optionally included in the flake shaped pigment 100, can include a dielectric material, e.g., such as silicon nitride ($Si_3N_4$), as an exterior outer layer formed on both sides of the first outer layer 140. These outer layers 140 and/or 160 protect the electrically conducting material layer 120 (e.g., aluminum layer) from oxidation and prevent galvanic corrosion when in near contact with the carbon fiber when such composition is applied. Exemplary embodiments of the flake shaped pigment 100 that include an optical absorber material in an outer protective layer, e.g., outer layer 140, can provide the overall composition with the ability to selectively absorb optical energy in a selected portion of the optical spectrum. The optical absorber materials are materials selected to absorb light in some or all of the visible wavelength spectrum, which is about 400 nm to 700 nm; correspondingly they have non-zero extinction coefficients (k) in this wavelength range (generally k>0.1) for some or all of the wavelengths in this range. In embodiments of the pigment 100, for example, the optical absorber material can be selected from thin film metal materials that cause interference or semiconductor materials that absorb light in the visible wavelength spectrum (e.g., 400-700 nm). In some implementations, an exemplary Si layer 140 can be configured to have a thickness in a range of 150 to 500 nm. In some implementations, an exemplary $Si_3N_4$ layer 160 can be configured to have a thickness in a range of 30 nm to 80 nm. In some implementations, for example, the length or width to thickness ratio for the pigment 100 can be configured to be at least ~3:1, and in some configurations, at least ~5:1.

A composition of the disclosed technology can include a paint binder that incorporates a plurality of the pigments 100. Also, for example, an exemplary paint binder that incorporates the pigment 100 can also serve to prevent galvanic corrosion when in near contact with the carbon fiber. The disclosed flake shaped pigment structures provide more overlap of electrically conductive material (e.g., the aluminum layer 120) than conventional non-flake shaped pigments, due to the large area and high aspect ratio of these metal flake pigments, their high levels of PVC in the paint, and the absence of electrically insulating colorant particles that typically consist of metal oxides.

Paints of the disclosed technology that include the paint binders incorporating the pigment 100 can be applied onto carbon or graphite composite structures to provide protection against extreme electrical discharge. In contrast, conventional paints that are painted onto carbon or graphite composite structures are electrically insulating, since the dried paint binder is a plastic and the pigment that is surrounded by the binder in conventional paints are also electrically insulating, e.g., generally consisting of a form of metal oxides and other compositions well known in the art. Some conventional approaches include metal powders such as aluminum or copper powders used as pigments in paints, such as described in European Patent Publication EP0629549A2. However, these powders are typically near spherically shaped and also tend to rapidly oxidize since they are not protected by any overcoating. In addition, the color is that of the metal powder, whereas it is desired to be able to provide any color of interest. While conventional colored pigments can be added to these metal powders, such colored pigments are electrically insulating. Thus, conventional paints or paints based on the metal powders, such as those described in EP0629549A2, with colors that differ from those of the metal powder alone, will consist of some amount of pigments that are solely composed of electrically insulating colorant material.

The pigment designs of the disclosed technology have a number of advantages for providing lightning strike protection, not previously realized. First the disclosed pigment designs preferably have a metallic electrically conducting center layer, which preferably include a metal, e.g., such as aluminum or copper (but may include any electrically conducting metal or composition), but may also include a semiconducting material such as silicon or a mixture such as 90% silicon-10% aluminum. Second, the disclosed pigments can be configured to have a flake-shaped geometry, so there is a high aspect ratio between either of the dimensions of the flake top and bottom surface, and the thickness of the flake. This high aspect ratio provides for significant overlap of flakes when incorporated into a paint, e.g., which provides for a more electrically conductive paint as compared to comparable materials that are not flake shaped, such as spherical or needle shaped pigments. This enhanced electrical conductance provides a lower resistance pathway than a conventional paint to spread the lightning strike current over a larger area and volume and also to provide a less destructive pathway to the electrically conductive graphite or carbon composite structure that is situated below the painted layer. In some applications, the carbon or graphite in carbon or graphite fiber composites has sufficient electrical conductance to safely conduct the lightning current. During a lightning strike, the paint of the present technology provides a significant improvement over conventional paint in providing a pathway for the lightning that does not result in significant damage to the composite structure.

The thicknesses and compositions of the pigment designs of the present technology provide for a pigment with an electrically conducting section that is flake shaped and also that is colored without the addition of electrically insulating pigment particles. The conducting section can include any number of different types of electrically conductive materials, e.g., such as metals, metallic alloys, mixtures containing metals, and/or semiconductors. For example, preferably metals are employed in the electrically conductive section of the pigment structure, e.g., such as aluminum, copper, chromium, titanium, silver, nickel, iron, alloys thereof or other metals used for thin film coatings. For example, semiconductors such as silicon can be included in the electrically conductive section. Also, for example, other electrically conductive materials such as transparent conductive oxides such as indium tin oxide can be included in the electrically conductive section. The coloring arises from interference and selective absorption due to the thin layers of different materials that are situated above and below the electrically conducting layer in the outer layer of the pigment structure. These thin layers can include optical absorber materials such as semiconductors (e.g., silicon or germanium) or thin metals (e.g., titanium or chromium), or they can include dielectric materials such as metal oxides, metal nitrides, metal fluorides, and other materials well known in the art for use in optical multilayer thin film coatings. Because these pigments are structured as thin flakes, for example, they tend to be situated in the paint with their flat flake faces parallel to the paint surface. In some implementations, for example, the pigment designs are configured to be all symmetric. In such designs, since pigments can orient with either side facing up, they are configured to be symmetric so that the color produced will be the same regardless of the pigment orientation in the paint binder. For electrically conductive pigments to be effective for lightning strike protection, it is critical some of the electrically conductive pigments be situated as close as possible to the surface of the paint and to also be distributed uniformly throughout the paint.

In the example shown in FIG. 2, the outer Si layer 140 and $Si_3N_4$ layer 160 of pigment 100 can be designed to produce the colored paint desired for the aircraft or other object that implements the exemplary composition. For example, in contrast, nickel powder based metal paint can only have the color of nickel. The use of the disclosed metal flake paint composition can allow customized colors by design of the pigment structure or by blending pigments with different designs into a paint, as well as improve the electrical conductance of the paint, e.g., as compared to typical spherical-type powders composed of metals.

Figure 3:
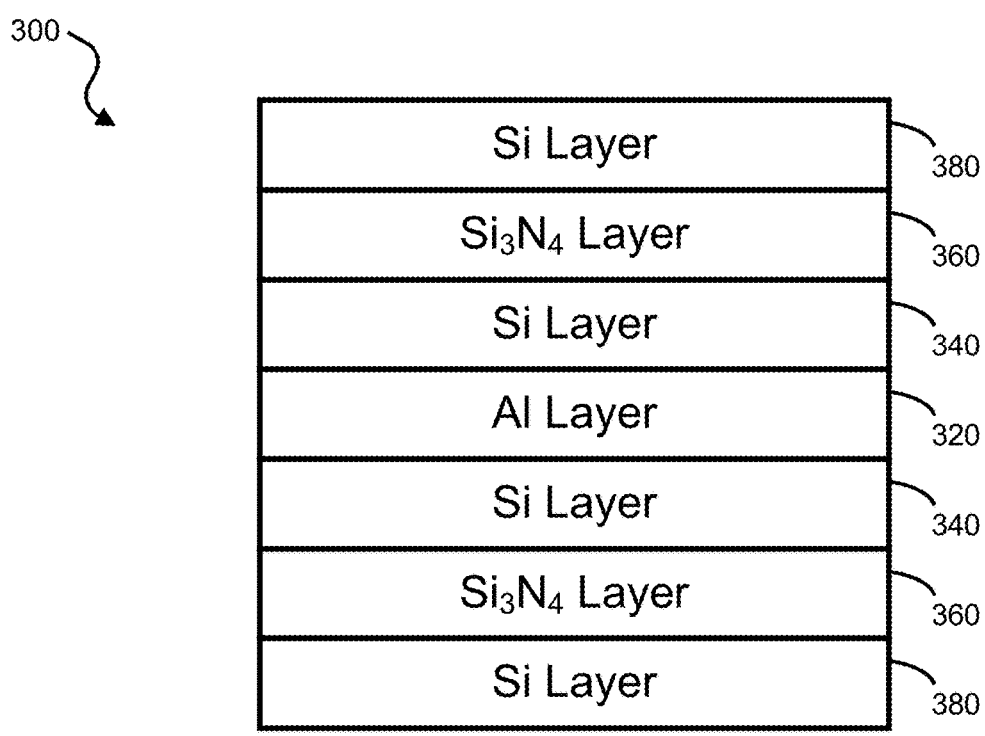
Figure 4:
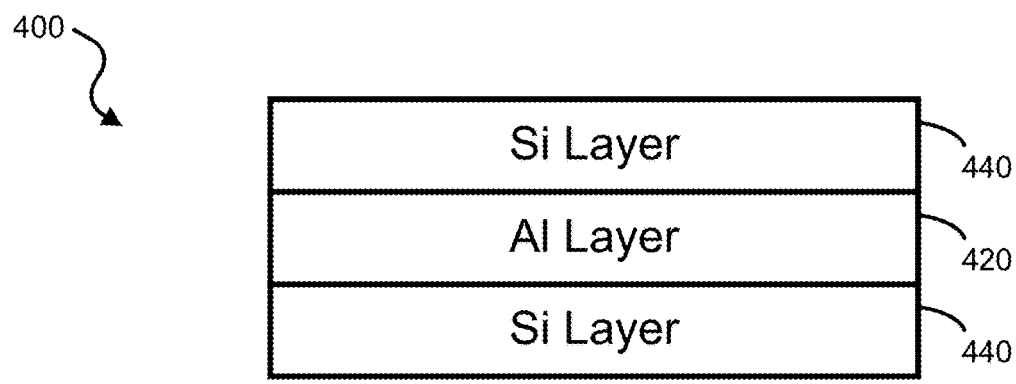
Figure 5:
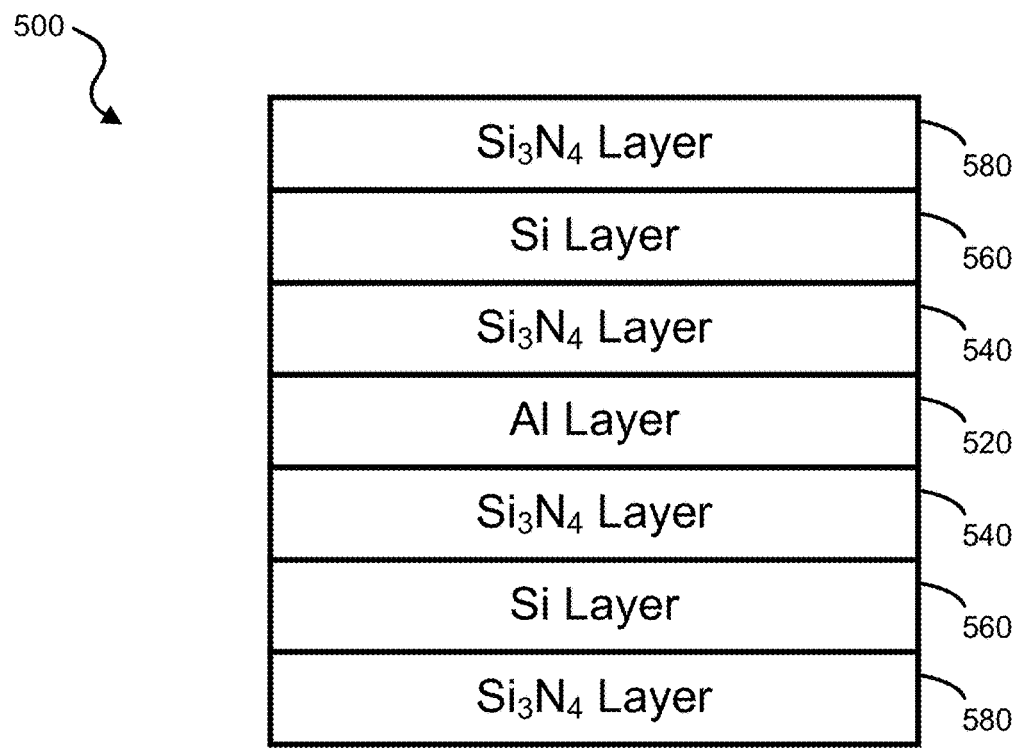

FIGS. 3-5 show block diagrams of additional exemplary flake pigment compositions for desired colored configurations.

In some embodiments, the disclosed LSP compositions can be configured in a paint binder to form a bright gray-blue color with the following exemplary design. FIG. 3 shows a block diagram of an exemplary bright gray-blue colored pigment composition 300. The pigment 300 includes a central metallic layer 320 formed of aluminum and having a thickness in a range of 50 to 5000 nm (e.g., preferably a 200 nm thick Al layer in some exemplary embodiments). The pigment 300 includes a first outer layer 340 of a semiconducting/absorber material including silicon and having a thickness in a range of 100 to 500 nm (e.g., preferably a 250 nm thick Si layer). The pigment 300 includes a second outer layer 360 of a dielectric material including silicon nitride and having a thickness in a range of 30 to 80 nm (e.g., preferably a 49 nm thick $Si_3N_4$ layer). The pigment 300 includes a third outer layer 380 of a semiconducting/absorber material including silicon and having a thickness in a range of 14 to 28 nm (e.g., preferably a 21 nm thick Si layer).

In some embodiments, the disclosed LSP compositions can be configured in the paint binder to form a gray color with the following exemplary design. FIG. 4 shows a block diagram of an exemplary gray colored pigment composition 400. The pigment 400 includes a central metallic layer 420 formed of aluminum and having a thickness in a range of 50 to 5000 nm (e.g., preferably a 200 nm thick Al layer in some exemplary embodiments). The pigment 400 includes a first outer layer 440 of a semiconducting/absorber material including silicon and having a thickness in a range of 150 to 500 nm (e.g., preferably a 250 nm thick Si layer).

In some embodiments, the disclosed LSP compositions can be configured in the paint binder to form a dark blue color with the following exemplary design. FIG. 5 shows a block diagram of an exemplary dark blue colored pigment composition 500. The pigment 500 includes a central metallic layer 520 formed of aluminum and having a thickness in a range of 50 to 5000 nm (e.g., preferably a 200 nm thick Al layer in some exemplary embodiments). The pigment 500 includes a first outer layer 540 of a dielectric material including silicon nitride and having a thickness in a range of 100 to 120 nm (e.g., preferably a 111 nm thick $Si_3N_4$ layer). The pigment 500 includes a second outer layer 560 of a semiconducting/absorber material including silicon and having a thickness in a range of 40 to 60 nm (e.g., preferably a 50 nm thick Si layer). The pigment 500 includes a third outer layer 580 of a dielectric material including silicon nitride and having a thickness in a range of 20 to 40 nm (e.g., preferably a 31 nm thick $Si_3N_4$ layer).

In some implementations, the flake based pigments may contain interference layers that produce a wide range of colors by interference, absorptance, or a combination of these effects as is well known in the art. Additional information pertaining to interference layers and/or the disclosed pigments is described in U.S. Patent Publication No. US 2011/0299167 A1 entitled "REFLECTIVE COATING, PIGMENT, COLORED COMPOSITION, AND PROCESS OF PRODUCING A REFLECTIVE PIGMENT" and U.S. Pat. No. 6,235,105 B1 entitled "THIN FILM PIGMENTED OPTICAL COATING COMPOSITIONS," both of which are incorporated by reference as part of the disclosure in this patent document. In summary, these interference flakes contain multiple layers that include metals, semiconductors, and/or dielectrics. Colors can be designed by techniques well known in the art for interference and color changing pigments.

The multi-layered LSP compositions and coatings of the present technology can be fabricated by the following exemplary techniques. Flakes with the exemplary properties described above can be made using a roll to roll web coating process, e.g., using physical deposition methods such as sputtering or evaporation. Sputtering is often preferred, for example, since it provides better control of coating thicknesses. The multilayer coatings that constitute the flakes can be coated onto a plastic film with a release coating. These coatings can be configured to be symmetric with respect to the center layer of the coating. After the coatings are made, the release coating is dissolved, leaving free standing multilayer coatings that are symmetric with respect to the center electrically conductive layer. These coatings can be subsequently ground and sorted to desired sizes using standard processes to form multilayer flake pigment. In some examples, typical dimensions for these exemplary flakes are 10-50 microns for each of the flat flake face (length or width) dimensions, and 0.2-2 microns for the thickness of the flakes.

In some implementations, the multi-layered LSP compositions and coatings can be configured in a metallic based paint, as shown in FIGS. 2-5. For example, the metallic based pigments can be structured to include at least 100 nm of aluminum or other electrically conductive material. Additional layers of metal, semiconductor, or dielectric materials can then be added to develop the desired color using commercial multilayer thin film design programs. Also, the exemplary outer hard silicon and/or silicon nitride layers make the pigments (and paints) of the disclosed compositions more rugged and environmentally stable than conventional metallic paints for LSP that consist of metal particles and/or electrically insulating colorant particles.

Figure 6:
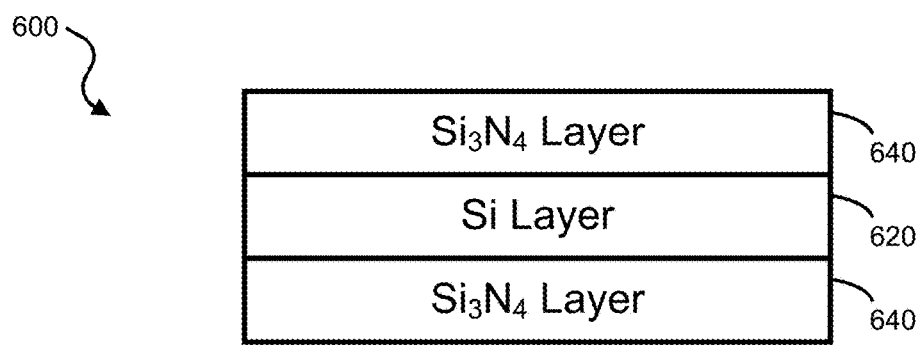
FIG. 6 shows a block diagram of an exemplary non-metallic pigment composition of the disclosed technology.

In other implementations, the multi-layered LSP-based compositions and coatings can be configured in a non-metallic based paint. For example, the non-metallic based pigments also can provide some lightning strike protection via the electrical conductance supplied by semiconductor layers or layers that consist of mixtures of semiconductor or dielectrics with regions of metal. In some examples, the non-metallic based pigments can be formed using 90% Si/10% Al sputtering targets for a sputtered film coating that results in a layer that includes Si in 90% of the volume of the layer and Al in 10 volume % of the layer. Also, for example, additional layers of semiconductor or dielectric can be added to develop the desired color using multilayer thin film design programs. FIG. 6 shows a block diagram of an exemplary non-metallic pigment composition 600. In this example, the pigment 600 includes a non-metallic central layer 620 including a semiconductor material, e.g., such as a silicon. The pigment 600 includes an outer layer 640 including a dielectric material, e.g., such as silicon nitride. In some implementations, for example, the outer layer 640 of the non-metallic pigment composition 600 can be structured to have a thickness in a range of 0 to 350 nm (e.g., preferably a 150 nm thick $Si_3N_4$ layer). Also, in some implementations, for example, the center layer 620 of the non-metallic pigment composition 600 can be structured to have a thickness in a range of 50 to 1000 nm (e.g., preferably a 250 nm thick Si layer). In some implementations, the non-metallic pigment composition 600 is structured to include an aspect ratio of length to thickness being at least 3:1, and in some implementations, at least 5:1. These exemplary non-metallic pigments can be used as the basis for paints that are sprayed on radomes, for example, to provide lightning strike protection for radomes without affecting the incoming or outgoing radar signals.

The exemplary paints of the disclosed technology have significant advantages over metal screens or foils that are incorporated into composite structures. The use of the exemplary lightning strike protective paints do not affect the mature fabrication processes that are used to produce composites, and thus do not affect the structural or physical properties of the composite structure. In addition, the exemplary paints can be used to retrofit lightning strike protection onto existing composite aircraft that do not currently possess lightning strike protection. Moreover, in lightning strike protection, it is necessary to electrically connect the entire aircraft, and painting provides a simple and low cost way to accomplish this.

In some embodiments, the multi-layered LSP pigment compositions can be made to leaf, in which some of the pigments preferentially lie near the surface of the paint layer and all pigments are not distributed evenly through the paint layer. For example, this can be done by using an additive such as stearic acid that coats the surface of each of the pigment particles and causes them to float to the surface of the paint while the paint dries. The increased surface electrical conductance caused by having a relatively higher density of the conductive pigments at or near the surface of the paint can improve the lightning strike capability of the paint.

Figure 7A:
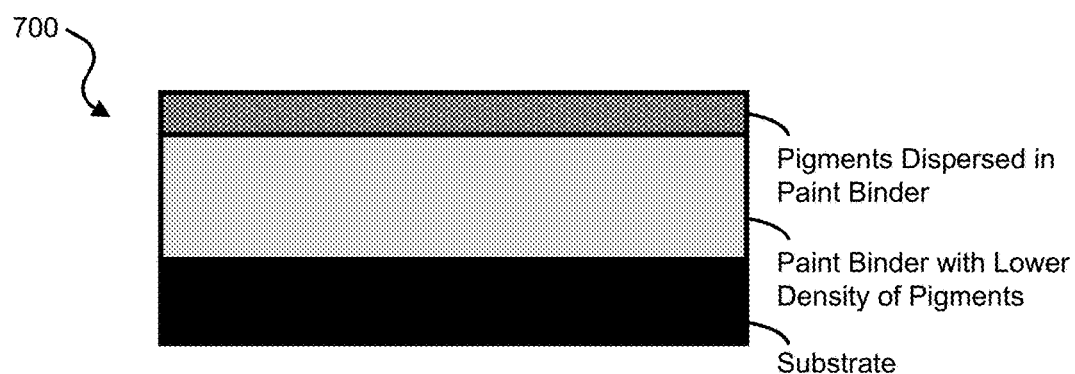
FIGS. 7A and 7B show block diagrams of exemplary leafed and non-leafed multi-layered pigment LSP compositions of the disclosed technology on a substrate.
Figure 7B:
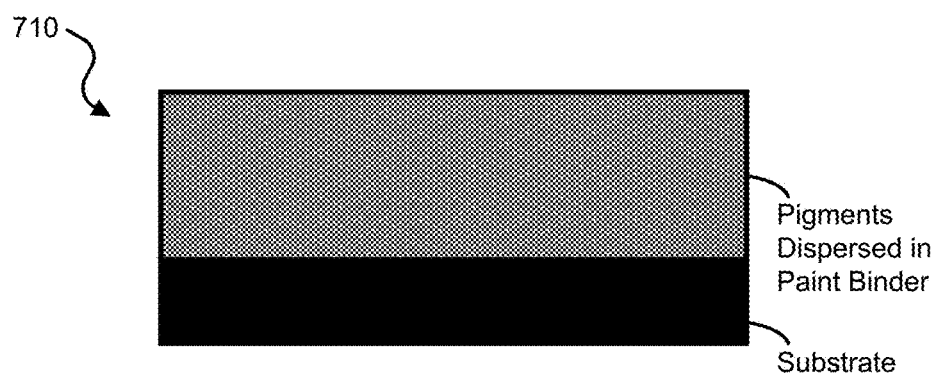

FIG. 7A shows a block diagram of an exemplary leafed multi-layered pigment LSP composition 700 of the disclosed technology on a substrate, in which the composition includes a first portion including most of the pigment structures (e.g., pigments 100, 300, 400, 500, or 600) dispersed in the paint binder, where the first portion is formed on a second portion including the paint binder with a lower density of the pigment structures formed over the substrate. FIG. 7B shows a block diagram of an exemplary non-leafed multi-layered pigment LSP composition 710 of the disclosed technology on a substrate, in which the composition includes the pigment structures (e.g., pigments 100, 300, 400, 500, or 600) dispersed substantially uniformly in the paint binder.

Figure 8A:
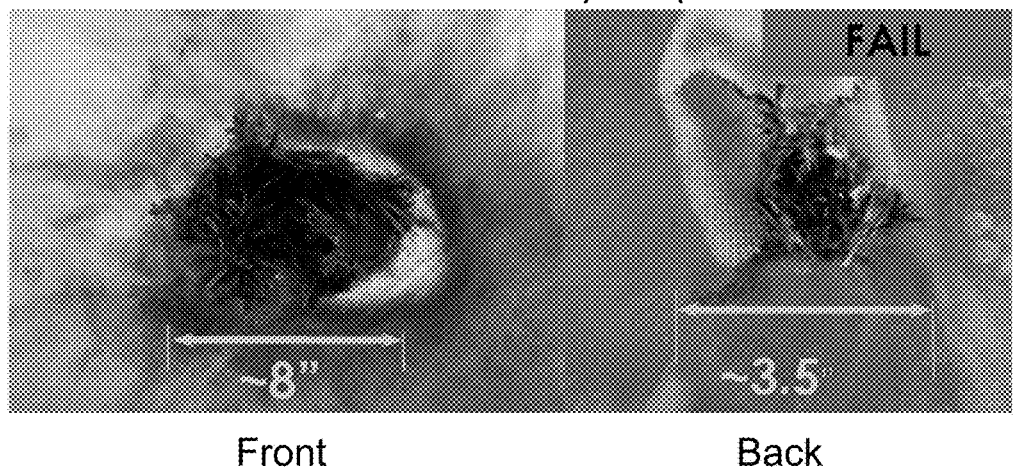
FIGS. 8A and 8B show images depicting exemplary results of a standard lightning strike test for Zone 1B for a graphite composite structure painted with a conventional aerospace paint and painted with an exemplary flake based metallic paint of the disclosed technology.
Figure 8B:
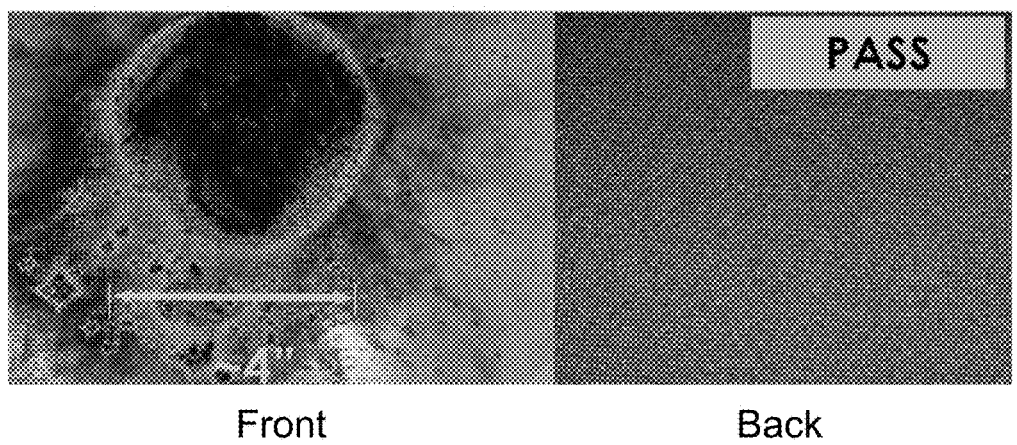

FIGS. 8A and 8B show images depicting exemplary results of a standard lightning strike test for Zone 1B for a graphite composite structure painted with a conventional aerospace paint and painted with an exemplary flake based metallic paint of the disclosed technology. FIG. 8A shows the exemplary results of a lightning strike test for Zone 1B for a multi-ply graphite composite structure painted with commercial non-metallic gray aircraft paint. Damage is evident through the entire structure, e.g., through the front and back sides of the structure. FIG. 8B shows the exemplary results of a lightning strike test for Zone 1B for the same multi-ply structure as in FIG. 8A, except that the graphite composite structure was painted with an exemplary gray lightning strike paint of the disclosed technology. While damage is seen for the first ply of the exemplary painted graphite composite structure of FIG. 8B, there is no visible damage through the structure, as the back side of the structure exhibits no damage.

For those embodiments where the coating is incorporated into the composite structure by co-curing as the outermost layer, the design need not be the symmetric designs shown in FIGS. 2-5. The designs can instead include the center electrically conductive layer and the layers to one side (on top of or below) of the center electrically conductive layer.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A composition for providing protection against electrical discharges, comprising:
    a binder material capable of dispersing material structures therein and attaching to a surface of a substrate; and
    a plurality of pigment structures dispersed in the binder material, the pigment structures including:
        a central layer including an electrically conducting material, and
        a first outer layer and a second outer layer formed on opposing surfaces of the central layer and structured to absorb light in at least some of the visible light spectrum, wherein the first and the second outer layers include a semiconductor material or a thin metal layer,
    wherein the pigment structures include a flake structure to provide electrically conductive paths in the binder material to transfer electrical current from a multi kiloamp electrical discharge within the composition.

2. The composition of claim 1, wherein the plurality of pigment structures include an aspect ratio of length to thickness being at least 3:1.

3. The composition of claim 1, wherein the electrically conducting material of the central layer includes a metal.

4. The composition of claim 3, wherein the metal includes aluminum or copper.

5. The composition of claim 1, wherein the electrically conducting material of the central layer includes a semiconducting material.

6. The composition of claim 5, wherein the semiconducting material includes silicon.

7. The composition of claim 1, wherein the semiconductor material of the first and the second outer layers include silicon, or wherein the thin metal layer of the first and the second outer layers include chromium or titanium.

8. The composition of claim 1, wherein the pigment structures further include a first and a second dielectric layer formed on the first and second outer layers, respectively, wherein the first and the second dielectric layer includes a dielectric material.

9. The composition of claim 8, wherein the dielectric material includes silicon nitride.

10. The composition of claim 8, wherein the pigment structures further include a third outer layer and a fourth outer layer formed on the first outer layer and the second outer layer, respectively, wherein the third and the fourth outer layers are structured to absorb light in at least some of the visible light spectrum and include a semiconductor material or a thin metal layer.

11. The composition of claim 10, wherein:
    the electrically conducting material of the central layer includes aluminum and is configured to have a thickness in a range of 50 nm to 5000 nm,
    the first and the second outer layers include silicon and are configured to have a thickness in a range of 100 nm to 500 nm,
    the first and the second dielectric layers include silicon nitride and are configured to have a thickness in a range of 30 nm to 80 nm, and
    the third and the fourth outer layers includes silicon and are configured to have a thickness in a range of 14 nm to 28 nm,
    and wherein the composition exhibits a bright gray-blue color on the substrate.

12. The composition of claim 1, wherein:
    the electrically conducting material of the central layer includes aluminum and is configured to have a thickness in a range of 50 nm to 5000 nm, and
    the first and the second outer layers include silicon and are configured to have a thickness in a range of 100 nm to 500 nm,
    and wherein the composition exhibits a gray color on the substrate.

13. The composition of claim 1, wherein the plurality of pigment structures are uniformly dispersed within the binder material.

14. The composition of claim 1, wherein the binder material is a paint.

15. The composition of claim 14, wherein the paint is configured to have a thickness in a range of 0.001 to 0.003 inches.

16. The composition of claim 1, wherein the composition includes a leafed structure having a first portion formed on a second portion that is attachable to the substrate, the first portion including a higher pigment volume concentration than in the second portion of the pigment structures dispersed in the binder material, and the second portion including a lower pigment volume concentration than in the first portion of the pigment structures dispersed in the binder material.

17. The composition of claim 1, wherein the substrate is a composite material on the exterior of an aircraft.

18. The composition of claim 17, wherein the composite material is a graphite fiber composite.

19. The composition of claim 1, wherein the pigment volume concentration of the pigment structures in the composition is between 10 and 30%.

20. The composition of claim 1, wherein the pigment structures are configured to have flat dimensions in a range from about 10-50 microns and a thickness in a range from about 0.2 to 2.0 microns.

21. A composition for providing protection against electrical discharges, comprising:
    a binder material capable of dispersing material structures therein and attaching to a surface of a substrate; and
    a plurality of pigment structures dispersed in the binder material, the pigment structures including:
        a central layer including an electrically conducting material, and
        a first dielectric layer and a second dielectric layer formed on opposing surfaces of the central layer, wherein the first and second outer dielectric layers include a dielectric material, wherein the pigment structures include a flake structure to provide electrically conductive paths in the binder material to transfer electrical current from a multi kiloamp electrical discharge within the composition,
wherein the composition includes a leafed structure having a first portion formed on a second portion that is attachable to the substrate, the first portion including a higher pigment volume concentration than in the second portion of the pigment structures dispersed in the binder material, and the second portion including a lower pigment volume concentration than in the first portion of the pigment structures dispersed in the binder material.

22. The composition of claim 21, wherein the plurality of pigment structures include an aspect ratio of length to thickness being at least 3:1.

23. The composition of claim 21, wherein the electrically conducting material of the central layer includes a metal.

24. The composition of claim 23, wherein the metal includes aluminum or copper.

25. The composition of claim 21, wherein the electrically conducting material of the central layer includes a semiconducting material.

26. The composition of claim 25, wherein the semiconducting material includes silicon.

27. The composition of claim 21, wherein the dielectric material includes silicon nitride.

28. The composition of claim 21, wherein the pigment structures further include a first and a second optical absorber layer formed on the first and second outer dielectric layers, respectively, wherein the first and the second optical absorber layers are structured to absorb light in at least some of the visible light spectrum and include a semiconductor material or a thin metal layer.

29. The composition of claim 28, wherein the semiconductor material of the first and the second optical absorber layers includes silicon, or wherein the thin metal layer of the first and the second optical absorber layers include chromium or titanium.

30. The composition of claim 28, wherein the pigment structures further include a third dielectric layer and a fourth dielectric layer formed on the first optical absorber layer and the second optical absorber layer, respectively, wherein the third and the fourth dielectric layers include a dielectric material.

31. The composition of claim 30, wherein:
the electrically conducting material of the central layer includes aluminum and is configured to have a thickness in a range of 50 nm to 5000 nm,
the first and the second dielectric layers include silicon nitride and are configured to have a thickness in a range of 100 nm to 120 nm,
the first and the second optical absorber layers include silicon and are configured to have a thickness in a range of 40 nm to 60 nm,
the third and the fourth dielectric layers include silicon nitride and is configured to have a thickness in a range of 20 nm to 40 nm,
and wherein the composition exhibits a dark blue color on the substrate.

32. The composition of claim 21, wherein the plurality of pigment structures are uniformly dispersed within the binder material.

33. The composition of claim 21, wherein the binder material is a paint.

34. The composition of claim 33, wherein the paint is configured to have a thickness in a range of 0.001 to 0.003 inches.

35. The composition of claim 21, wherein the substrate is a composite material on the exterior of an aircraft.

36. The composition of claim 35, wherein the composite material is a graphite fiber composite.

37. The composition of claim 21, wherein the pigment volume concentration of the pigment structures in the composition is between 10 and 30%.

38. The composition of claim 21, wherein the pigment structures are configured to have flat dimensions in a range from about 10-50 microns and a thickness in a range from about 0.2 to 2.0 microns.

39. A composition for providing lightning strike protection for a composite structure, comprising:
a binder material capable of dispersing material structures therein and attaching to a surface of the composite structure; and
a plurality of pigment structures dispersed in the binder material, the pigment structures including a layer of an electrically conducting material, in which the pigment structures include an aspect ratio of length to thickness being at least 3:1,
wherein the pigment structures include a flake structure to provide electrically conductive paths in the binder material to lightning strike electrical discharges within the composition.

40. The composition of claim 39, wherein the composition is capable of protecting the composite structure from the lightning strike electrical discharges such that there is no or insubstantial damage throughout the thickness of the composite structure.

41. The composition of claim 39, wherein the pigment structures further include a first outer layer and a second outer layer formed on the opposing surfaces of the layer of the electrically conducting material, wherein the first and the second outer layers include an optical absorber material structured to absorb light in at least some of the visible light spectrum and including a semiconductor material or a thin metal layer.

42. The composition of claim 41, wherein the pigment structures further include a first dielectric layer and a second dielectric layer formed on the first and the second outer layers, respectively, wherein the first and the second outer layers include a dielectric material.

43. The composition of claim 42, wherein the pigment structures further include a third outer layer and a fourth outer layer formed on the first outer layer and the second outer layer, respectively, wherein the third and the fourth outer layers are structured to absorb light in at least some of the visible light spectrum and include a semiconductor material or a thin metal layer.

44. The composition of claim 39, wherein the pigment structures further include a first dielectric layer and a second dielectric layer formed on the opposing surfaces of the layer of the electrically conducting material.

45. The composition of claim 44, wherein the pigment structures further include a first outer layer and a second outer layer formed on the first and the second dielectric layers, respectively, wherein the first and the second outer layers include an optical absorber material structured to absorb light in at least some of the visible light spectrum and including a semiconductor material or a thin metal layer.

46. The composition of claim 45, wherein the pigment structures further include a third dielectric layer and a fourth dielectric layer formed on the first and the second outer layers, respectively.

47. The composition of claim 39, wherein the composition includes a leafed structure having a first portion formed on a second portion that is attachable to the composite material, the first portion including a relatively higher pigment volume concentration than in the second portion of the pigment structures dispersed in the binder material, and the second portion including a relatively lower pigment volume concentration than in the first portion of the pigment structures dispersed in the binder material.

48. The composition of claim 39, wherein the composite material includes graphite fiber, the composite material included on an exterior of an aircraft.

49. The composition of claim 39, wherein the composition is configured to have a thickness in a range of 0.001 to 0.003 inches over the composite structure.

50. The composition of claim 39, wherein the volume concentration of the pigment structures in the composition is between 10 and 30%.

51. The composition of claim 39, wherein the pigment structures are configured to have flat dimensions in a range from about 10-50 microns and a thickness in a range from about 0.2 to 2.0 microns.

\* \* \* \* \*